United States Patent

Ishihara

[11] Patent Number: 5,386,203
[45] Date of Patent: Jan. 31, 1995

[54] ANTENNA COUPLER

[75] Inventor: Jinsei Ishihara, Toyama, Japan

[73] Assignee: Murata Manufacturing Co., Ltd., Japan

[21] Appl. No.: 166,439

[22] Filed: Dec. 14, 1993

[30] Foreign Application Priority Data

Dec. 16, 1992 [JP] Japan .................. 4-336226

[51] Int. Cl.$^6$ ............................ H04B 1/54
[52] U.S. Cl. .................... 333/129; 455/82
[58] Field of Search ........... 333/126, 129, 132, 134; 370/32, 38; 455/78, 80, 82

[56] References Cited

U.S. PATENT DOCUMENTS 4,910,481 3/1990 Sasaki et al. .................. 333/134

FOREIGN PATENT DOCUMENTS 233943 11/1985 Japan .................. 455/82

Primary Examiner—Paul Gensler
Attorney, Agent, or Firm—Heller, Ehrman, White & McAuliffe

[57] ABSTRACT

An antenna coupler is inserted between an antenna and communication systems operating in two different frequency bands. A matching circuit allows signals in either of these frequency bands to be transmitted only between the antenna and a sorter corresponding to the frequency band which serves to sort signals in the frequency band into a reception band and a transmission band. Reception and transmission filters corresponding to the two frequency bands are provided for limiting reception signals received from the antenna and transmission signals from the communication systems within a reception band or a transmission band in the corresponding frequency band.

3 Claims, 3 Drawing Sheets

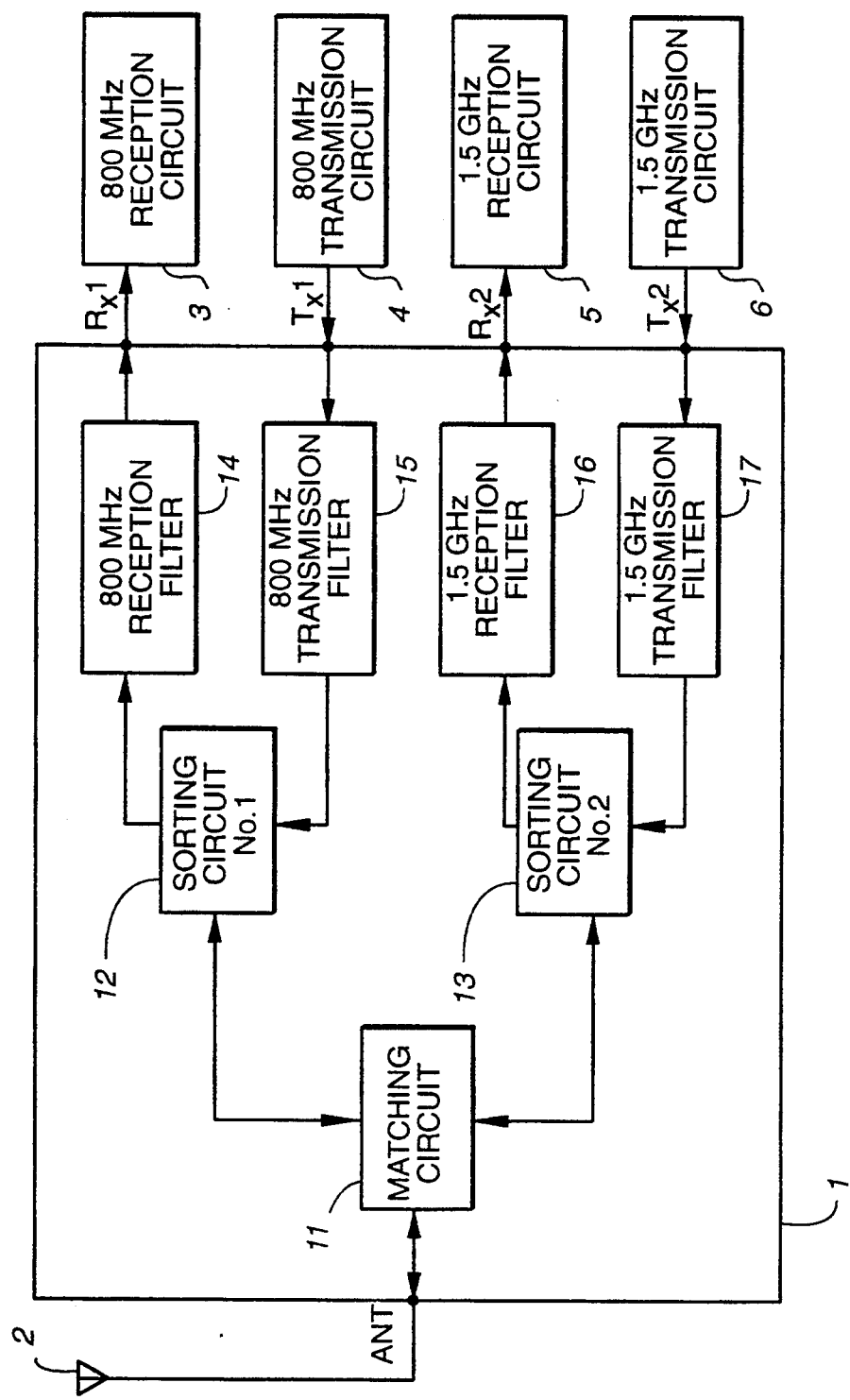
FIG._1

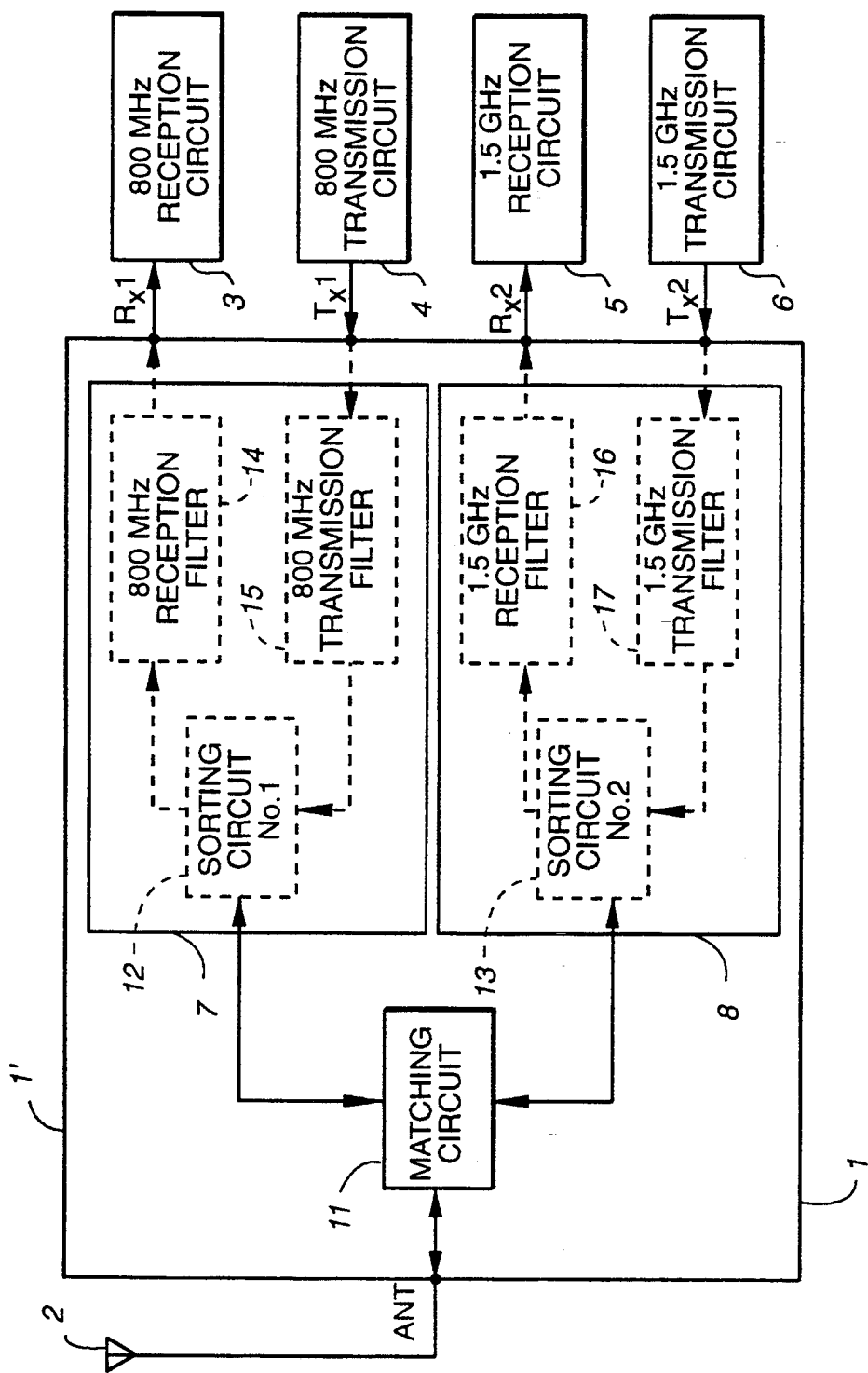
FIG._2

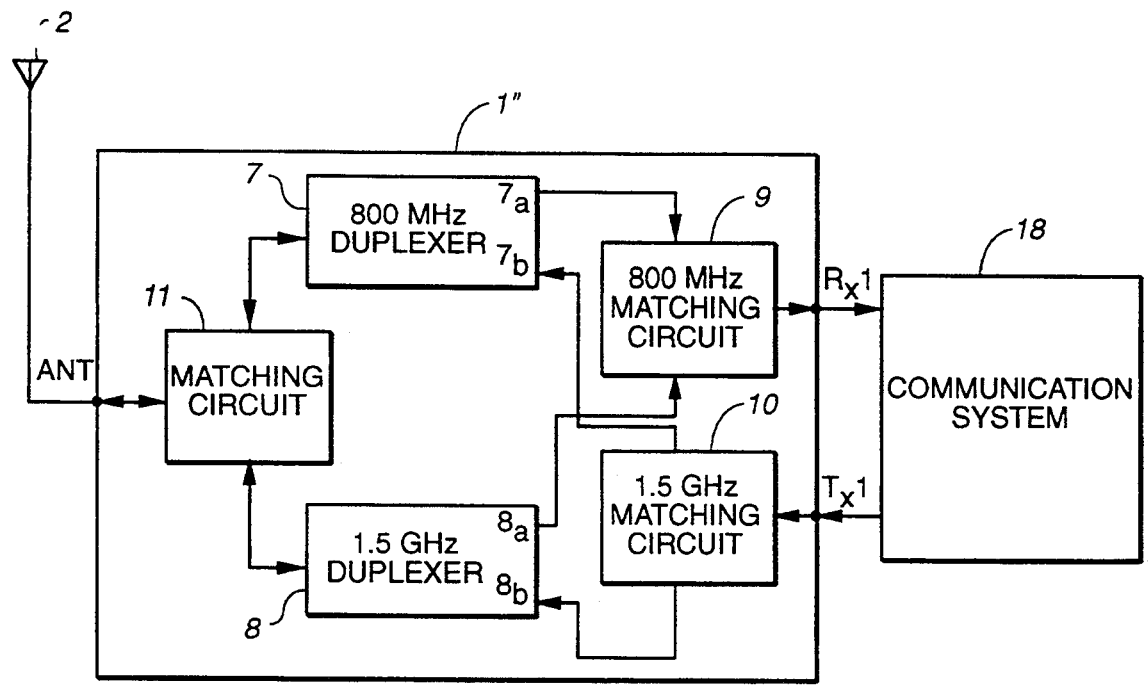
FIG._3
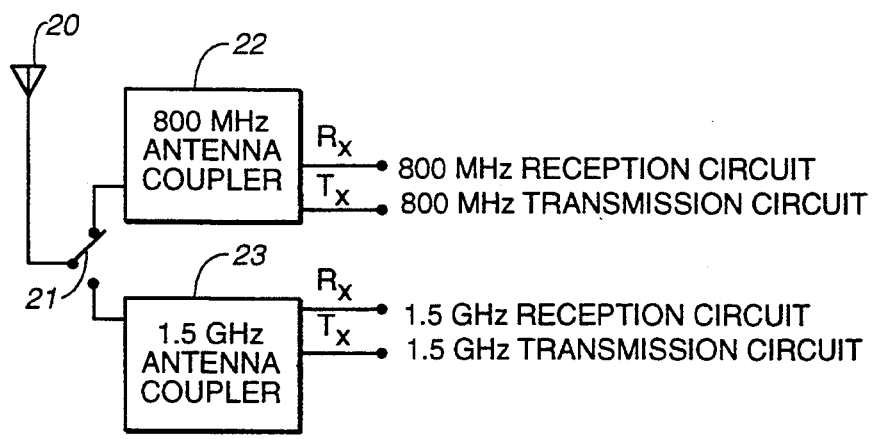
FIG._4 (PRIOR ART)

ANTENNA COUPLER

BACKGROUND OF THE INVENTION

This invention relates to an antenna coupler interposed between an antenna and communication systems which both use it for receiving and transmitting signals in different frequency bands.

When two communication systems operate in frequency bands which are relatively close to each other, it has been known to connect them to a common antenna. In FIG. 4, which shows a prior art structure for providing a common antenna 20 to communication systems each operating in a different frequency band, numeral 21 indicates a switch means comprising a coaxial switch or a PIN diode, numeral 22 indicates an antenna coupler for an 800 MHz frequency band, and numeral 23 indicates an antenna coupler for a 1.5 GHz frequency band. The reception terminals (Rx terminals) of the antenna couplers 22 and 23 are connected respectively to reception circuits for the 800 MHz and 1.5 GHz frequency bands, and the transmission terminals (Tx terminals) of the antenna couplers 22 and 23 are connected respectively to transmission circuits for the 800 MHz and 1.5 GHz frequency bands. The antenna 20 is selectively connected to either of the antenna couplers 22 and 23 through the switch means 21 for operations in the 800 MHz or 1.5 GHz band.

With a prior art antenna coupler thus formed, however, the number of constituent parts increases because of the need for the switch means. The cost of the coupler increases, if a coaxial switch is used as the switch means. If a PIN diode is substituted as the switch means, on the other hand, there are adverse effects such as deterioration in the insertion loss of the antenna couplers 22 and 23.

SUMMARY OF THE INVENTION

It is therefore an object of the invention to provide an inexpensive antenna coupler with reduced adverse effects on its characteristics for allowing a single antenna to be used in two frequency bands which are relatively close to each other.

An antenna coupler according to the invention, to be inserted between an antenna and a communication system operating in a first frequency band and another communication system operation in a second frequency band such that the antenna can be used in common by the two communication systems, with which the above and other objects can be accomplished, may be characterized as comprising: (1) a first sorting circuit for sorting signals in the first frequency band between a transmission band and a reception band; (2) a second sorting circuit for sorting signals in the second frequency band between a transmission band and a reception band; (3) a matching circuit for matching the communication systems with the antenna in these first and second frequency bands such that signals in the first frequency band are transmitted only between the antenna and the first sorting circuit and signals in the second frequency band are transmitted only between the antenna and the second sorting circuit; (4) a first reception filter for guiding a signal in the first frequency band received from the antenna through the matching circuit and the first sorting circuit by limiting it within a specified band; (5) a first transmission filter for guiding a signal received from a communication system operating in the first frequency band to the first sorting circuit by limiting it within a specified band; (6) a second reception filter for guiding a signal in the second frequency band received from the antenna through the matching circuit and the first sorting circuit by limiting it within a second specified band; and (7) a second transmission filter for guiding a signal received from a communication system operating in the second frequency band to the second sorting circuit by limiting it within a specified band.

Of signals of many kinds received by the antenna, those within the first or second frequency band are guided by the matching circuit respectively to the first or second sorting circuits, while those in the other frequency band are prevented by the matching circuit from passing through. Reception signals (received through the matching circuit) in the first frequency band are guided through the first sorting circuit to the first reception filter and, after they are limited within a specified band, outputted to a communication system operating in the first frequency band. Similarly, reception signals (received through the matching circuit) in the second frequency band are guided through the second sorting circuit to the second reception filter and, after they are limited within a specified band, outputted to a communication system operating in the second frequency band. On the other hand, transmission signals outputted from a communication system operating in the first frequency band are inputted into the first transmission filter and, after they are limited within a specified band, guided to the first sorting circuit. They are further guided through the matching circuit from the first sorting circuit to the antenna, and transmitted therefrom into the air. Similarly, transmission signals outputted from a communication system operating in the second frequency band are inputted into the second transmission filter and, after they are limited within a specified band, guided to the second sorting circuit. They are further guided through the matching circuit from the second sorting circuit to the antenna, and transmitted therefrom into the air.

BRIEF DESCRIPTION OF THE DRAWINGS

The accompanying drawings, which are incorporate form a part of this specification, illustrate embodiments of the invention and, together with the description, serve to explain the principles of the invention. In the drawings:

FIG. 1 is a block diagram showing the structure of an antenna coupler embodying the present invention;

FIG. 2 is a block diagram showing the structure of another antenna coupler embodying the present invention;

FIG. 3 is a block diagram showing the structure of still another antenna coupler embodying the present invention; and FIG. 4 is a block diagram showing the structure of a prior art antenna coupler.

DETAILED DESCRIPTION OF THE INVENTION

FIG. 1 shows an antenna coupler 1 for use in frequency bands for automobile telephones, adapted to use a common antenna 2 for a communication system operating in an 800 MHz frequency band and another communication system operating in a 1.5 GHz frequency band. The antenna coupler 1 has an antenna terminal (ANT), first and second reception terminals (Rx1 and Rx2), and first and second transmission terminals (Tx1 and Tx2) on its exterior and a matching circuit 11, first and second sorting circuits 12 and 13 an 800 MHz reception filter 14, an 800 MHz transmission filter 15, a 1.5 GHz reception filter 16 and a 1.5 GHz transmission filter in its interior.

The antenna terminal ANT is for connection to the antenna 2. The first reception and transmission terminals Rx1 and Tx1 are respectively for connection to a reception circuit 3 and a transmission circuit 4 of a communication system operating in an 800 MHz frequency band. The second reception and transmission terminals Rx2 and Tx2 are respectively for connection to a reception circuit 5 and a transmission circuit 6 of a communication system operating in a 1.5 GHz frequency band. The matching circuit 11 is for matching the antenna coupler 1 with the antenna 2 in the 800 MHz and 1.5 GHz frequency bands, comprising a distribution constant line or an LC phase shifter of a known kind. Through this matching circuit 11, signals in the 800 MHz frequency band are transmitted only between the antenna terminal ANT and the first sorting circuit 12, and no signal in this band is transmitted between the antenna terminal ANT and the second sorting circuit 13 or between the first and second sorting circuits 12 and 13. Similarly, signals in the 1.5 GHz frequency band are transmitted through the matching circuit 11 only between the antenna terminal ANT and the second sorting circuit 13, and no signal in this band is transmitted between the antenna terminal ANT and the first sorting circuit 12 or between the first and second sorting circuits 12 and 13.

The first sorting circuit 12 is for sorting between a transmission band and a reception band of the 800 MHz frequency band, and reception signals in the 800 MHz frequency band received thereby from the antenna 2 through the matching circuit 11 are outputted only to the 800 MHz reception filter 14. On the other hand, transmission signals in the 800 MHz frequency band inputted thereto through the 800 MHz transmission filter 15 from the transmission circuit 4 operating in the 800 MHz frequency band are outputted only to the matching circuit 11 through the first sorting circuit 12.

The second sorting circuit 13 is for sorting between a transmission band and a reception band of the 1.5 GHz frequency band, functioning similarly to the first sorting circuit 12. That is, reception signals in the 1.5 GHz frequency band received thereby from the matching circuit 11 are outputted only to the 1.5 GHz reception filter 16, and transmission signals in the 1.5 GHz frequency band inputted thereto through the 1.5 GHz transmission filter 17 are outputted only to the matching circuit 11. Both the first and second sorting circuits 12 and 13, like the matching circuit 11, may each comprise, for example, a distribution constant line or an LC phase shifter of a known kind.

The 800 MHz reception filter 14 is a bandpass filter adapted to extract signals in a specified reception band (or the first reception band) in the 800 MHz frequency band, and the 800 MHz transmission filter 15 is another bandpass filter adapted to extract signals in a specified transmission band (or the first transmission band) in the 800 MHz frequency band. Similarly, the 1.5 GHz reception filter 16 is a bandpass filter adapted to extract signals in a specified reception band (or the second reception band) in the 1.5 GHz frequency band, and the 1.5 GHz transmission filter 17 is another bandpass filter adapted to extract signals in a specified transmission band (or the second transmission band) in the 1.5 GHz frequency band. These filters 14–17 may each be an dielectric filter having dielectric coaxial resonators connected together in series.

Of reception signals received by the antenna 2, those in the 800 MHz frequency band are guided by the matching circuit 11 to the first sorting circuit 12, those in the 1.5 GHz frequency band are guided by the matching circuit 11 to the second sorting circuit 13, and the other signals are stopped by the matching circuit 11. Signals in the 800 MHz frequency band are guided by the first sorting circuit 12 to the 800 MHz reception filter 14 and, after they are thereby limited within a specified band (or the first reception band), outputted through the first reception terminal Rx1 to the reception circuit 3 operating in the 800 MHz frequency band. Similarly, signals in the 1.5 GHz frequency band are guided by the second sorting circuit 13 to the 1.5 GHz reception filter 16 and, after they are thereby limited within another specified band (or the second reception band), outputted through the second reception terminal Rx2 to the reception circuit 5 operating in the 1.5 GHz frequency band.

In the case of a transmission, transmission signals inputted through the first transmission terminal Tx1 from a transmission circuit operating in the 800 MHz frequency band are limited within a specified band (or the first transmission band) by the 800 MHz transmission filter 15 and thereafter guided by the first sorting circuit 12 only to the matching circuit 11. They are then outputted therefrom to the antenna 2 and transmitted therefrom into the air. Similarly, transmission signals inputted through the second transmission terminal Tx2 from a transmission circuit operating in the 1.5 GHz frequency band are limited within a specified band (or the second transmission band) by the 1.5 GHz transmission filter 17 and thereby guided by the second sorting circuit 13 only to the matching circuit 11 and then to the antenna 2 therefrom through the antenna terminal ANT.

FIG. 2 is a block diagram showing the structure of another antenna coupler 1' according to a second embodiment of the invention. This antenna coupler 1' is different from the one described above with reference to FIG. 1 in that the first sorting circuit 12, the 800 MHz reception filter 14 and the 800 MHz transmission filter 15 are replaced by an 800 MHz duplexer coupler 7 and that the second sorting circuit 13, the 1.5 GHz reception filter 16 and the 1.5 GHz transmission filter 17 are replaced by a 1.5 GHz duplexer coupler 8. Each of these duplexers 7 and 8 may be structured as a combination of a sorting circuit 12 or 13, a reception filter 14 or 16, and a transmission filter 15 or 17, as shown in FIG. 2 by broken lines, functioning like either of the prior art antenna couplers 22 and 23 shown in FIG. 4. More generally, the duplexers 7 and 8 may be each described as a component having an antenna terminal to be connected to an antenna (say, through a matching circuit 11), a reception terminal to be connected to a signal-receiving circuit, and a transmission terminal to be connected to a signal-transmitting circuit (these terminals not shown as such in FIG. 2) and allowing signals received through its antenna terminal to be transmitted out only through its reception terminal by limiting them within a specified reception frequency band, and signals received through its transmission terminal to be transmitted out only through its antenna terminal by limiting them within a specified transmission frequency band.

FIG. 3 is a block diagram showing the structure of still another antenna coupler 1" according to a third embodiment of the invention. This antenna coupler 1" is different from the one shown in FIG. 2 in that the second reception and transmission terminals Rx2 and Tx2 are removed, that a matching circuit 9 is provided between the first reception terminal Rx1 and reception terminals 7a and 8a respectively of duplexers 7 and 8, and that another matching circuit 10 is provided between the first transmission terminal Tx1 and transmission terminals 7b and 8b respectively of the duplexers 7 and 8. The duplexers 7 and 8 are adapted to function as explained above with reference to FIG. 2, respectively operating in the 800 MHz and 1.5 GHz frequency bands. The first reception and transmission terminals Rx1 and Tx1 are respectively connected to reception and transmission terminals of a communication system 18 provided with reception and transmission circuits operating in the 800 MHz and 1.5 GHz frequency bands (such as shown at 3, 4, 5 and 6 in FIGS. 1 and 2).

The matching circuit 9 is adapted to output reception signals in the 800 MHz frequency band outputted from the reception terminal 7a of the 800 MHz duplexer 7 only to the first reception terminal Rx1 without allowing them to reach the 1.5 GHz duplexer 8. Reception signals in the 1.5 GHz frequency band outputted from the reception terminal 8a of the duplexer 8 are outputted only through the first reception terminal Rx1 without being allowed to reach the 800 MHz duplexer 7.

Similarly, the other matching circuit 10 is adapted to output transmission signals in the 800 MHz frequency band outputted from the transmission terminal Tx1 only to the 800 MHz duplexer 7 without reaching the 1.5 GHz duplexer 8. Transmission signals in the 1.5 GHz frequency band from the transmission terminal Tx1 are outputted only to the 1.5 GHz duplexer 8 without reaching the 800 MHz duplexer 7. Both these matching circuits 9 and 10 may also comprise, for example, a distribution constant line or an LC phase shifter of a known kind.

As explained above, the present invention relates to an antenna coupler to be interposed between an antenna and communication systems such that transmission and receptions of signals can take place in each of two frequency bands. Since the antenna coupler according to the present invention includes a first antenna coupling means for sorting transmission and reception signals within a first frequency band, a second antenna coupling means for sorting transmission and reception signals within the second frequency band, and a matching circuit for matching the antenna with the first and second antenna coupling means, a common antenna can be used for communication systems operating in different frequency bands without adversely affecting the characteristics of the antenna. A further advantage of the present invention is that the size and cost of communication systems can be reduced by using a single antenna in common for communications in two different frequency bands.

What is claimed is:

1. An antenna-coupler for allowing a first communication system operating in a first frequency band and a second communication system operating in a second frequency band to use a single antenna in common, being interposed between said communication systems and said antenna, said first frequency band being separable into a first reception band and a first transmission band, said second frequency band being separable into a second reception band and a second transmission band, said antenna coupler comprising:

a first sorting means for sorting signals between said first reception band and said first transmission band;

a second sorting means for sorting signals between said second reception band and said second transmission band;

a matching means for allowing signals in said first frequency band to be transmitted only between said antenna and said first sorting means and signals in said second frequency band to be transmitted only between said antenna and said second sorting means;

a first reception filter means for guiding a reception signal in said first frequency band received from said antenna through said matching means and said first sorting means by limiting said reception signal within said first reception band;

a first transmission filter means for guiding a transmission signal received from said first communication system operating in said first frequency band to said first sorting means by limiting said transmission signal within said first transmission band;

a second reception filter means for guiding a reception signal in said second frequency band received from said antenna through said matching means and said second sorting means by limiting said reception signal within said second reception band; and a second transmission filter means for guiding a transmission signal received from said second communication system operating in said second frequency band to said second sorting means by limiting said transmission signal within said second transmission band.

2. An antenna coupler for allowing a first communication system operating in a first frequency band and a second communication system operating in a second frequency band to use a single antenna in common, being interposed between said communication systems and said antenna, said first frequency band being separable into a first reception band and a first transmission band, said second frequency band being separable into a second reception band and a second transmission band, said antenna coupler comprising:

a first duplexer means operating in said first frequency band;

a second duplexer means operating in said second frequency band; and a matching means for allowing signals in said first frequency band to be transmitted only between said antenna and said first duplexer means and signals in said second frequency band to be transmitted only between said antenna and said second duplexer means;

said first duplexer means having a first reception terminal and a first transmission terminal and allowing reception signals in said first frequency band received from said antenna through said matching means to be transmitted out of said first duplexer means only through said first transmission terminal by limiting said reception signals within said first reception band, and transmission signals in said first frequency band received through said first transmission terminal to be transmitted out of said first duplexer means only through said matching by limiting said transmission signals within said first transmission band; and said second duplexer means having a second reception terminal and a second transmission terminal and allowing reception signals in said second frequency band received from said antenna through said matching means to be transmitted out of said second duplexer means only through said second transmission terminal by limiting said reception signals within said second reception band, and transmission signals in said second frequency band received through said second transmission terminal to be transmitted out of said second duplexer means only through said matching means by limiting said transmission signals within said second transmission band.

3. An antenna coupler for allowing a communication system operating in a first frequency band and a second frequency band to use a single antenna in common, being interposed between said communication system and said antenna, said first frequency band being separable into a first reception band and a first transmission band, said second frequency band being separable into a second reception band and a second transmission band, said antenna coupler comprising:

a first duplexer means operating in said first frequency band and having a first reception terminal and a first transmission terminal;
  a second duplexer means operating in said second frequency band and having a second reception terminal and a second transmission terminal; and
  a matching means for allowing signals in said first frequency band to be transmitted only between said antenna and said first duplexer means and signals in said second frequency band to be transmitted only between said antenna and said second duplexer means;
  said first duplexer means allowing reception signals in said first frequency band received from said antenna through said matching means to be transmitted out of said first duplexer means only through said first transmission terminal by limiting said reception signals within said first reception band, and transmission signals in said first frequency band received through said first transmission terminal to be transmitted out of said first duplexer means only through said matching means by limiting said transmission signals within said first transmission band; and said second duplexer means allowing reception signals in said second frequency band received from said antenna through said matching means to be transmitted out of said second duplexer means only through said second transmission terminal by limiting said reception signals within said second reception band, and transmission signals in said second frequency band received through said second transmission terminal to be transmitted out of said second duplexer means only through said matching means by limiting said transmission signals within said second transmission band;

said antenna coupler further comprising:
  means for allowing reception signals in said first frequency band received through said first reception terminal of said first duplexer means to be outputted only to said communication system and allowing reception signals in said second frequency band received through said second reception terminal of said second duplexer means to be outputted only to said communication system; and
  means for allowing transmission signals in said first frequency band received from said communication system to be outputted only to said first duplexer means and allowing transmission signals in said second frequency band received from said communication system to be outputted only to said second duplexer means.

* * * * *